Sept. 24, 1957
I. C. STOVER
2,807,634
DRY RENDERING COOKER
Filed March 31, 1954
2 Sheets-Sheet 1
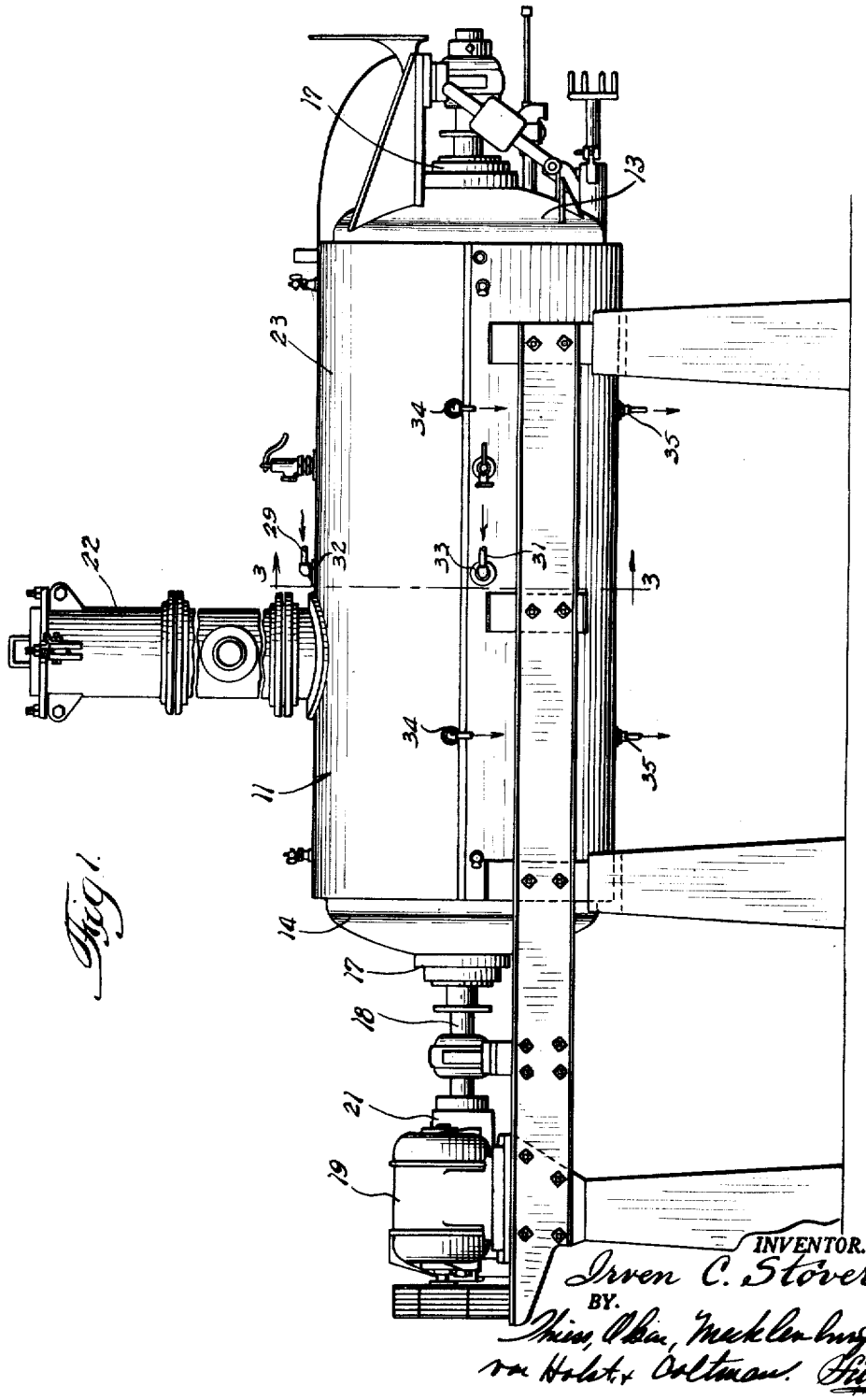

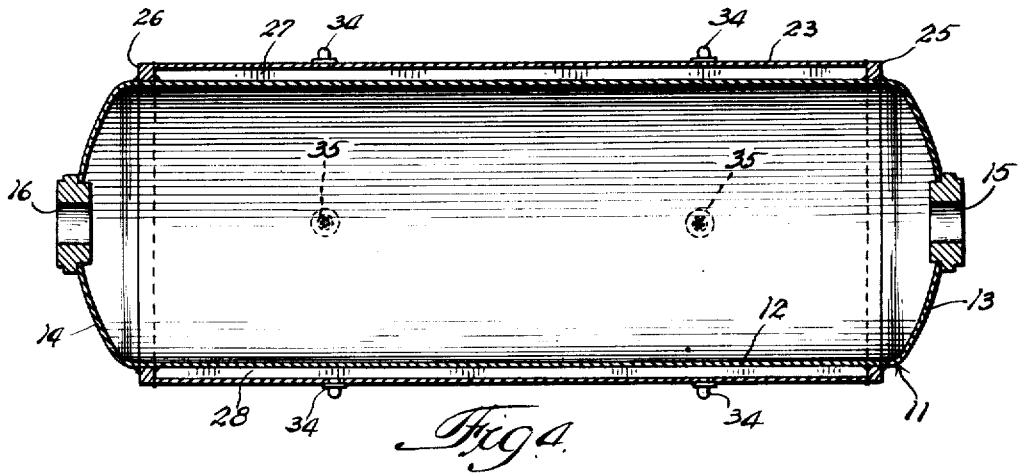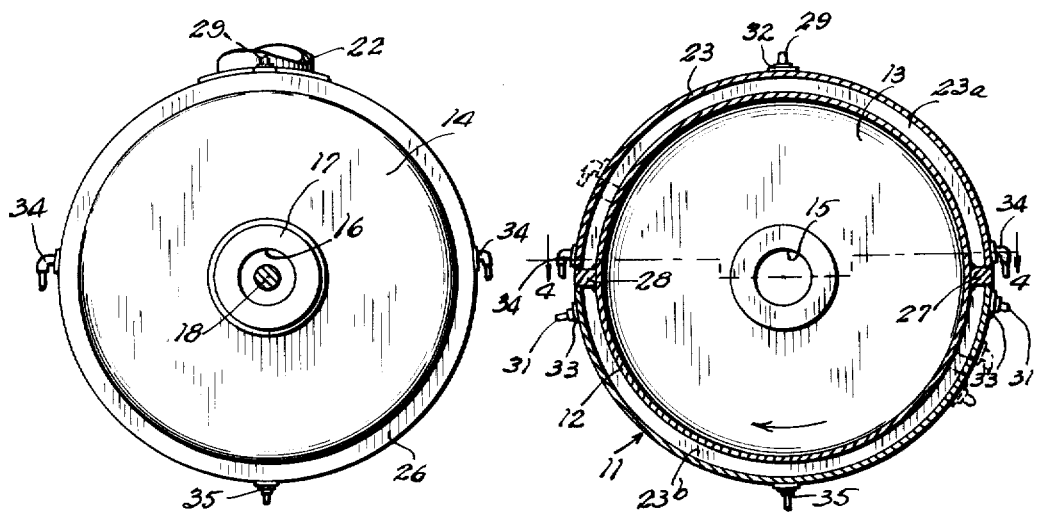

United States Patent Office 2,807,634
Patented Sept. 24, 1957

2,807,634
DRY RENDERING COOKER
Irven C. Stover, Duluth, Minn.
Application March 31, 1954, Serial No. 420,078
7 Claims. (Cl. 260—412.6)

The present invention relates to cookers and has special reference to dry rendering cookers employed for rendering the fat from animal matter.

More particularly, this invention has reference to a dry rendering cooker comprising a preferably horizontal vessel having a rotating agitator and a compartmentized steam jacket or hollow wall with vertically arranged compartments to permit the controlled heating of the vessel. The compartments may be formed by an outer shell arranged about and spaced from the cooking vessel with horizontal partitions dividing the space between the vessel and outer shell.

In dry rendering cookers heretofore used, the steam employed to heat the material to the desired temperature was supplied to a single compartment surrounding substantially the entire wall of the vessel so that all parts of the vessel wall, except possibly the ends thereof, were simultaneously subjected to the steam.

It has been the practice in using dry rendering cookers to substantially fill the vessel with the material to be treated prior to the commencement of the rendering operation or to gradually fill the vessel to a substantial extent by adding a number of small batches at spaced intervals during the initial phases of the operation. While the cooker is generally substantially filled at the beginning of the operation or shortly thereafter, the material decreases in volume to a marked extent as the cooking progresses, so that during the latter part or at the end of the operation, the vessel may be only about half full and the upper walls of the vessel are above the body of material except as material is spattered thereon. Because of the high temperature of the vessel walls above the level of the material, the particles which splash thereon are rapidly burned or charred. Some of the burned particles will drop back into the body of the material in the lower part of the vessel darkening and discoloring it, thereby lowering the grade, quality and value of the grease.

The remainder of the particles splashed or spattered on the exposed vessel wall adheres to it until eventually a layer of charred or burned material substantially covers the entire upper portion of the vessel wall. As this layer will retard the flow of heat and if not removed, will also greatly darken and discolor subsequent loads or batches cooked in the vessel, it is frequently necessary to scrape and clean at least the upper portions of the interior vessel walls.

When substantially the entire periphery of the vessel wall is heated during the entire cooking operation, the supply of heat to the material being rendered is uneven. The material which is splattered or thrown against the upper wall portions above the level of the material has a tendency to be overcooked with respect to the rest of the material. Due to this nonuniformity of the cooked material more fines are present in the resulting grease which, as above explained, is also of reduced quality and value because of its darker color and impurities therein. In addition, the cracklings themselves which are left after the grease is expressed are less uniform.

With a dry rendering cooker embodying the present invention, the disadvantages of the prior art cookers are overcome and the grease resulting from the rendering operation, whether intended for use in edible products, such as lard, or inedible products, such as tallow, is purer, lighter colored and of a superior quality and higher value.

By dividing the space between the vessel wall and the outer shell thereabout into separate vertically arranged compartments, the steam required for heating the material being rendered may be supplied to those compartments of the vessel wall which are not substantially above the level of the material in the cooker. These compartments, which preferably extend horizontally the length of the vessel, may be formed by horizontally arranged partitions extending the length of the outer shell. It may be sufficient to have a single partition at each side of the vessel about midway between the top and bottom thereof, although, in some instances, superior results may be attained by the provision of a greater number of partitions about the upper portion of the vessel. Moreover, as the general level of the material may be higher at one side of the vessel than at the other, due to rotation of the agitator in one direction, it may be desirable to have the lowermost partition at one side of the vessel a little below the normal level of the substantially cooked material and the lowermost partition at the opposite side somewhat above such level.

With this construction steam may be supplied to all the compartments to heat substantially the entire periphery of the vessel when the cooker is substantially filled, such as at the beginning of a rendering operation. Subsequently, as the rendering operation proceeds and the volume of the material in the vessel shrinks, steam may be cut off from the compartment or compartments at the upper side of the vessel, thereby reducing the temperature of the vessel wall above the level of the material so that particles of materials splashed or spattered thereon, instead of being burned or charred, will merely run down into the mass of material in the bottom without any harmful effect. The rendered material will therefore be substantially uniformly cooked, free of burned and charred matter, of light color, and superior grade.

Although the steam is supplied only to the lower compartment or compartments toward the end of the rendering operation, the time of cooking is not substantially increased and may be decreased.

An object of the present invention is to provide a rendering cooker having means for controlling the supply of heat to various parts of the cooker wall.

Another object is to provide a rendering cooker having provision for reducing the temperature of the vessel walls above the level of the material therein.

A further object is to provide a rendering cooker for uniformly cooking the material therein.

A still further object is to provide a rendering cooker which will efficiently render material therein without burning or discoloring the material treated.

Still another object is to provide a rendering cooker of the above type which will produce purer, light colored grease of superior quality.

Further objects and advantages will be apparent from the following description and claims when considered with the drawings in which:

Figure 1 is a side elevational view of a dry rendering cooker embodying the present invention mounted on a supporting structure, together with the driving means for the agitator therein;

Fig. 2 is an end elevational view of the cooker shown in Fig. 1;

Fig. 3 is a cross-sectional view of the cooker taken on line 3—3 of Fig. 1 with the agitator omitted, and Fig. 4 is a horizontal cross-sectional view of the outer walls of said cooker taken on the line 4—4 of Fig. 3.

Referring more particularly to the drawings, there is shown a dry rendering cooker embodying the present invention. This cooker comprises a horizontally arranged, substantially cylindrical vessel 11 having a side wall 12 and heads 13 and 14 at opposite ends. Openings 15 and 16 are provided in the heads of the vessel for receiving therein stuffing boxes 17 through which extend an agitator shaft 18 preferably provided with paddles of the type shown in Bilek Patent No. 2,650,807, dated September 1, 1953. The paddles may be driven by a motor 19 through a gear reducer 21. A suitable charging dome 22 is arranged at the top of the cooker to permit the supply of material to be rendered.

Positioned about the side wall 12 of the vessel 11, and spaced therefrom, is an outer shell 23. The shell 23 may be divided, as shown in Fig. 3, with one portion overlying the upper part of the vessel wall and the lower portion adjacent the lower part of the vessel wall. Both the vessel and the outer shell are preferably made of steel.

Annular rings 25 and 26 are secured about the vessel wall 12 between the ends thereof and the ends of the outer shell 23. These annular rings 25 and 26 may be rectangular in cross section and are welded to both the vessel wall 12 and the outer shell 23 to seal off the space and form a chamber between the vessel wall and the shell.

As shown in Fig. 3, a longitudinally extending partition or dividing member, preferably substantially rectangular in cross section, is arranged at each side of the vessel 11. These partitions 27 and 28 preferably extend the full length of the shell 23 and are welded to the outer sides of the vessel walls 12 and to the upper and lower portions of the shell 23, thereby forming a compartment 23a above the partitions 27 and 28 and a second compartment 23b therebelow.

In the form of cooker illustrated only two partitions 27 and 28 are employed. These are arranged at opposite sides of the vessel at substantially the median plane thereof. However, the partitions 27 and 28 may be above the median plane of the vessel or even therebelow, depending upon the conditions of its use. Moreover, in addition to the two partitions 27 and 28, additional longitudinally extending partitions may be employed thereabove, thereby forming additional separate vertically arranged compartments about the upper part of the vessel wall 12.

The cooker shown is designed to be heated by steam supplied to the compartments about the vessel wall 12. For this purpose steam supply lines 29 and 31 communicate with inlets 32 and 33, preferably adjacent the top of these steam chambers 23a and 23b. Suitable valves are employed in the steam supply lines 29 and 31 for independently controlling the supply of steam to the two chambers 23a and 23b. Outlets 34 and 35 communicate with the lower portions of the chambers to permit the withdrawal of condensate therefrom.

If additional partitions, similar to the partitions 27 and 28, are employed to form a greater number of vertically arranged chambers, steam supply inlets and condensate outlets are provided for each of the chambers permitting each of the chambers to be independently controlled and heated.

Instead of having the partitions 27 and 28 substantially opposite each other, it may be desirable, under certain circumstances, to lower the partition 27 and raise the partition 28, as illustrated by dotted lines in Fig. 3. When an agitator shaft with paddles thereon is employed to rotate in the direction of the arrow (Fig. 3) the level of the material, at least toward the latter part of the rendering operation, will be lower on the right side and higher on the left side, due to the rotation of the paddles.

In operating a dry rendering cooker embodying the present invention, the fat-containing material to be rendered may be fed into the vessel through the charging dome 22 until the vessel is substantially filled. Thereupon, or prior thereto, steam is admitted through the various supply pipes to all of the chambers about the vessel to heat the material to a desired rendering temperature. During the cooking the agitating shaft is rotated. As the operation progresses, the volume of the material being rendered gradually decreases until, toward the end of the operation, the level thereof will be substantially lower, and may be at substantially the median plane of the vessel.

As the volume of the material being rendered decreases, the steam to the upper compartment or compartments is reduced or cut off entirely, thereby lowering the temperature of the vessel walls above the level of the material therein. Due to the rotation of the agitator shaft with the paddles thereon, material in the vessel is agitated and varying amounts thereof are spattered on the vessel walls above the level of the material. With the supply of steam to the chambers adjacent these portions of the vessel wall cut off or materially reduced, the temperature of these wall portions will be below that at which the material splattering thereon is burned, charred, or otherwise hardened or solidified. Consequently, this material runs down again into the body of the material being rendered without being overheated or harmfully affected in any way. Consequently, the grease resulting from the use of the present cooker and the method of rendering material therein is light colored and is relatively free from impurities, and overcooked or charred particles.

While a cooker having two chambers, as shown in Fig. 3, has proved very satisfactory in operation, it may be desirable to increase the number of vertically arranged chambers above the partitions 27 and 28. By so doing, steam to the chambers at a greater distance from the top of the vessel can be successively cut off as the level of the material being rendered drops due to the cooking operation.

Through the use of cookers embodying the present invention and the method of rendering therein the time required for a cooking operation is not substantially increased over the use of cookers in which steam is continuously supplied to all parts of the vessel wall throughout the cooking operation and, in many instances, the time of cooking may be substantially reduced.

If desired, the heads of the vessel may also be double walled with steam compartments therein. In such constructions it may be desirable to have vertically arranged compartments with the supply of steam to each independently controlled. However, this is usually not necessary as there is relatively little spattering of material on the ends of the vessel. Moreover, in many cookers the ends of the vessel are not heated and all of the heat is supplied through the side thereof.

Through the use of the present cooker and the method of rendering material therein, the rendering grease is pure, lighter colored and of superior quality. Moreover, the cracklings remaining after the grease is separated therefrom are also of improved quality.

Not only are both the resulting grease and cracklings of superior quality, but it is unnecessary to frequently clean the inside of the vessel to remove the material which has spattered on the sides and adhered thereto, frequently becoming hard and of dark color, as is the case with the use of cookers of the type hereinabove employed. Throughout the application it is this adherence of the material to the sides of the vessel and consequent hardening and darkening that is referred to as burning or charring whether or not there is any actual carbonization thereof.

While particular embodiments of this invention have been illustrated and described, it will be understood, of course, that the invention is not to be limited thereto, since many modifications may be made, and it is contemplated, therefore, by the appended claims, to cover any

I claim:

1. A substantially cylindrical horizontally arranged dry rendering cooker having a compartmentized peripheral wall with a plurality of substantially vertically arranged separate compartments extending horizontally most of the length of the said cooker about the side walls thereof for receiving therein heating media, and means for controlling the supply of heating media to each of said compartments independently.

2. A substantially cylindrical horizontally arranged dry rendering cooker having a compartmentized side wall with at least one horizontally extending compartment substantially coextensive with the upper portion of said side wall and at least one separate horizontally extending compartment substantially coextensive with the lower portion of said side wall for receiving therein heating media, and means including valves for controlling the supply of heating media to each of said compartments independently.

3. A dry rendering cooker comprising a substantially cylindrical horizontally arranged vessel for receiving the material to be rendered, an outer shell positioned about the side wall of said vessel and spaced therefrom, means for sealing the end portions of said shell to said vessel to form a closed chamber therebetween, a substantially horizontal extending partition member at each side of said cooker between said vessel and said shell forming separate compartments on each side thereof, and means for controlling the supply of heating media to each of said compartments independently.

4. A dry rendering cooker comprising a substantially cylindrical horizontally arranged vessel for receiving the material to be rendered, an outer shell positioned about the side wall of said vessel and spaced therefrom, means for sealing the end portions of said shell to said vessel to form a closed chamber therebetween and a substantially horizontally extending partition member at each side of said cooker adjacent the median plane thereof between said vessel and said shell forming separate compartments on each side thereof, and means for controlling the supply of heating media to each of said compartments independently.

5. Method of rendering fat from animal matter containing the same in a vessel which comprises heating the said matter by supplying heat to the greater portion of the walls of the vessel and as the volume of said matter decreases substantially reducing the supply of heat to those portions of the walls of the vessel which are substantially above the level of said matter while containing the supply of heat to those wall portions below the level of said matter.

6. Method of rendering fat from animal matter containing the same in a vessel which comprises heating most of the area of said vessel walls to a temperature sufficient to bring said matter to rendering temperature and thereafter, as the volume of matter in the vessel decreases, reducing the temperature of the portions of vessel walls substantially above the level of said matter while continuing the supply of heat to those wall portions below the level of said matter whereby adherence of said matter spattered on said walls above the level of said matter and the charring thereof is substantially eliminated.

7. Method of rendering fat from animal matter containing the same in a vessel which comprises heating most of the area of said vessel walls to a temperature sufficient to bring said matter to rendering temperature, agitating said material, and thereafter, as the volume of matter in the vessel decreases, reducing the temperature of the portions of vessel walls substantially above the level of said matter while continuing the supply of heat to those wall portions below the level of said matter whereby adherence of said matter spattered on said walls above the level of said matter and the charring thereof is substantially eliminated.

References Cited in the file of this patent

UNITED STATES PATENTS

| Number | Name | Date |
|---|---|---|
| 825,905 | Hellyer | July 17, 1906 |
| 1,109,144 | Perkins | Sept. 1, 1914 |
| 1,394,736 | Kamrath | Oct. 25, 1921 |
| 1,420,648 | Mabee | June 27, 1922 |
| 1,993,264 | Duttweiler | Mar. 5, 1935 |
| 2,199,670 | Lowry | Mar. 7, 1940 |
| 2,450,575 | Bolling | Oct. 5, 1948 |
| 2,671,658 | Moore | Mar. 9, 1954 |

UNITED STATES PATENT OFFICE
CERTIFICATE OF CORRECTION

Patent No. 2,807,634

September 24, 1957

Irven C. Stover

It is hereby certified that error appears in the printed specification of the above numbered patent requiring correction and that the said Letters Patent should read as corrected below.

Column 6, line 7, for "containing" read -- continuing --.

Signed and sealed this 12th day of November 1957.

(SEAL)
Attest:

KARL H. AXLINE
Attesting Officer

ROBERT C. WATSON
Commissioner of Patents